United States Patent [19]

Mase

[11] 4,099,450
[45] Jul. 11, 1978

[54] FEED MECHANISM

[75] Inventor: Yoji Mase, Toyokawa, Japan

[73] Assignee: Kondo Manufacturing Co., Ltd., Japan

[21] Appl. No.: 666,089

[22] Filed: Mar. 11, 1976

[30] Foreign Application Priority Data

Jun. 27, 1975 [JP] Japan .................................. 50/80402

[51] Int. Cl.$^2$ .......................................... F15B 13/043
[52] U.S. Cl. ...................................... 91/403; 91/404;
91/445; 91/447; 91/452; 83/617
[58] Field of Search ................. 91/449, 404, 459, 445,
91/447, 452, 403, 405, 407; 83/617, 639

[56] References Cited

U.S. PATENT DOCUMENTS

| 1,990,052 | 2/1935 | Sosa | 91/449 X |
|---|---|---|---|
| 2,066,109 | 12/1936 | Hirvonen | 91/422 |
| 2,073,518 | 3/1937 | Hirvonen | 408/17 |
| 2,674,138 | 4/1954 | Mize | 408/1 |
| 2,858,802 | 11/1958 | Parsons et al. | 92/163 |
| 2,955,539 | 10/1960 | Gardner | 91/459 X |
| 2,976,852 | 3/1961 | Goldring | 91/459 X |
| 3,004,528 | 10/1961 | Logan, Jr. et al. | 91/459 |
| 3,162,249 | 12/1964 | Kuipers et al. | 91/445 X |
| 3,186,307 | 6/1965 | Ellenbogen | 91/407 X |
| 3,216,444 | 11/1965 | Herner | 91/405 X |
| 3,224,341 | 12/1965 | Bean | 91/407 X |
| 3,489,063 | 1/1970 | Piret | 91/361 X |
| 3,663,138 | 5/1972 | Petroff | 91/405 X |
| 3,700,396 | 10/1972 | Adams | 91/449 |

FOREIGN PATENT DOCUMENTS

| 372,378 | 4/1973 | U.S.S.R. | 91/449 |

Primary Examiner—Irwin C. Cohen
Attorney, Agent, or Firm—Hill, Gross, Simpson, Van Santen, Steadman, Chiara & Simpson

[57] ABSTRACT

A fluid cylinder assembly includes a cylinder and a piston slidably disposed in the cylinder, the cylinder having a cylinder bore closed at both ends by end caps. One of the end caps is provided therein with a flow control valve assembly for controlling the fluid flow from the cylinder bore during a working stroke of the fluid cylinder assembly. The flow control valve assembly comprises a poppet valve having a pair of poppets on a valve rod and a spool valve movable in response to the operation of the poppet valve. The poppet valve is shiftable by a solenoid alternately energized and deenergized by an electric control circuit which is closed just before contact of a cutter on the piston rod with a workpiece.

17 Claims, 5 Drawing Figures

FEED MECHANISM

BACKGROUND OF THE INVENTION

1. Field of the Invention

This invention relates to apparatus for controlling the speed of operation of a fluid cylinder assembly which can be used as the prime mover in a feed mechanism.

2. Prior Art

A fluid cylinder assembly has been used as a feed mechanism, as in a machine tool, the speed of operation of the cylinder assembly being controlled by a hydraulic circuit including a flow control valve, a check valve and other devices provided between the fluid cylinder and a source of fluid under pressure such as a fluid pressure accumulator. The conventional cylinder assembly has required complicated and bulky piping for the control circuit and the feed mechanism thus becomes too large.

SUMMARY OF THE INVENTION

Accordingly, it is a primary object of the present invention to provide a feed mechanism, such as for machine tools, which is small in size by housing a speed control hydraulic circuit in a closed end cap of a fluid cylinder.

Another object of the present invention is to provide a feed mechanism including a control device capable of driving the tool slide of a machine tool at a wide variety of rates of speed.

According to the present invention, the speed of operation of a fluid cylinder assembly is controlled by a flow control valve assembly housed in an end cap of the fluid cylinder assembly. The flow control valve assembly comprises a poppet valve having a pair of poppets on a valve rod and a spool valve movable in response to the operation of the poppet valve. The poppet valve is shiftable by a solenoid mounted on the end cap of the cylinder. The solenoid is alternately energized and de-energized by an electric control circuit which is closed just before a cutter on the piston rod is brought into contact with a workpiece.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS

AS SHOWN ON THE DRAWINGS

Figure 1:
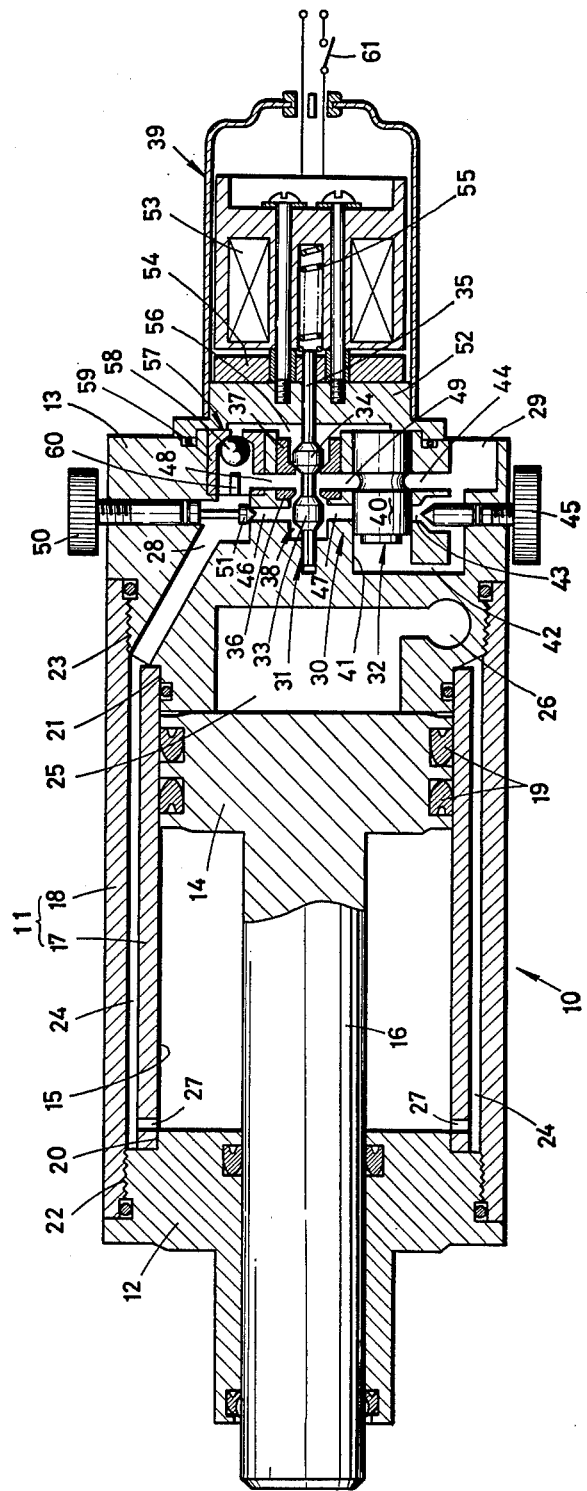
FIG. 1 is a longitudinal cross-sectional view of a feed mechanism according to the invention, showing parts just before a piston rod starts advancing.

The principles of the present invention are particularly useful when embodied in a feed mechanism such as shown in FIG. 1. The feed mechanism includes a fluid cylinder assembly 10 having a cylinder tube unit 11, and an end cap 12 for the rod end, an end cap 13 for the closed end, a piston 14 disposed in a bore 15, and a piston rod 16 extending from the piston 14 through the rod end cap 12. The cylinder tube unit 11 is comprised of an inner cylinder tube 17 and an outer cylinder tube 18 spaced radially from the inner tube 17 in which the piston 14 is slidable, there being rings or seals 19 acting between the piston 14 and the inner cylinder tube 17. The inner cylinder tube 17 is attached at both axial ends to inner stepped portions 20, 21 of the end caps 12, 13, respectively, and the outer cylinder tube 18 is attached at both axial ends to outer stepped portions 22, 23 of the end caps 12, 13, respectively. Between the inner and outer cylinder tubes 17, 18, an annular bypass or bypass passage 24 is defined for conducting return fluid.

The closed end cap 13 has a pressure chamber 25 formed therein and disposed at the right side of the piston 14 which is the high pressure side during a working stroke of the fluid cylinder assembly 10, the pressure chamber 25 being connected to a port 26 communicating with a fluid pressure accumulator (not shown). The cylinder bore 15 communicates with the annular bypass 24 through apertures or radial openings 27 defined in the inner cylinder tube 17, which apertures 27 are located adjacent to the rod end cap 12. The closed end cap 13 is also provided with a passageway or internal port 28 therein to connect the bypass 24 with an external port 29. Pressurization at the port 26 shifts the piston 14 to the left for a working stroke during which time the port 29 conducts return fluid. This movement places the piston rod 16 under compression during the working stroke. Travel of the piston 14 is limited by the end caps 12, 13.

To regulate the movements of the piston 14, a flow control valve assembly generally indicated at 30 is provided in the closed end cap 13. The valve assembly 30 includes a poppet valve 31 and a spool valve 32. The poppet valve 31 has a pair of poppets on a valve rod 35, namely poppets 33, 34 which are engageable with a pair of valve seats 36, 37, respectively. The poppet valve 31 is shiftable in a valve bore 38 by a solenoid actuator 39 as described below. The spool valve 32 comprises a spool 40 slidably disposed in a bore 41 from which extend passageways 42, 43 and 44 to the port 29. A throttling valve 45 restricts the fluid flow through the central passageway 43. A pair of aligned passages 46, 47 are provided one on each side of the poppet valve bore 38, the passage 46 communicating the passageway 28 with the spool valve bore 41, the passages 46, 47 being in alignment with the passageway 43. A pair of aligned passages 48, 49 are also provided one on each side of the poppet valve bore 38 to communicate the passageway 28 with the spool valve bore 41, the passages 48, 49 being in alignment with the passageway 44. A selector valve 50 having a restrictor 51 controls the fluid flow through the passage 46.

The solenoid 39 is secured to a bracket 52 mounted on an end surface of the end cap 13 and has a winding 53 and a ferromagnetic plate 54 located adjacent to and movable toward and away from the winding 53, the ferromagnetic plate 54 being normally biased away from the winding 53 or to the left as viewed in FIG. 1 by a compression spring 55. The rod 35 of the poppet valve 31 has one end fixed to the ferromagnetic plate 54 and is shiftable between two positions. That is, when the solenoid 39 is de-energized, the poppet valve rod 35 is held in a first position in which the poppet 33 is away from its seat 36 and the poppet 34 engages its seat 37.

When the solenoid 39 is energized, the rod 35 is moved into a second position in which the poppet 33 engages the seat 36 and the poppet 34 is unseated. The solenoid 39 is energized by a switch 61 which is controlled by an electric circuit later described.

Between the bracket 52 and the end cap 13, there is defined a passage 56 extending from the right end of the spool valve bore 41 to passageway 28 through a check valve 57 which prevents the fluid flow from the passageway 28 to the passage 56. The check valve 57 includes a ball 58, a valve seat 59 on which the ball 58 is normally seated, and a stop 60 for limiting the movement of the ball 58 away from the valve seat 59.

STARTING POSITION

A switch or relay contact 61 is opened to de-energize the solenoid 39, whereby the poppet valve 31 is held in the first position shown in FIG. 1 and the spool valve 32 is moved to the right as shown in FIG. 1, so that the passageway 28 communicates with the outlet port 29 through the passages 48, 49 and the passageway 44. The restrictor 51 of the selector 50 closes the passage 46.

RAPID ADVANCE

With all operative parts in the starting position, pressurized liquid is supplied to the inlet port 26 to raise the pressure in the chamber 25, thus moving the piston 14 rapidly to the left. The fluid in the cylinder bore 15 is forced out through the apertures 27, the bypass passage 24, the passageway 28, thence through the passages 48, 49 and the passageway 44 to the outlet port 29.

STOP

Figure 2:
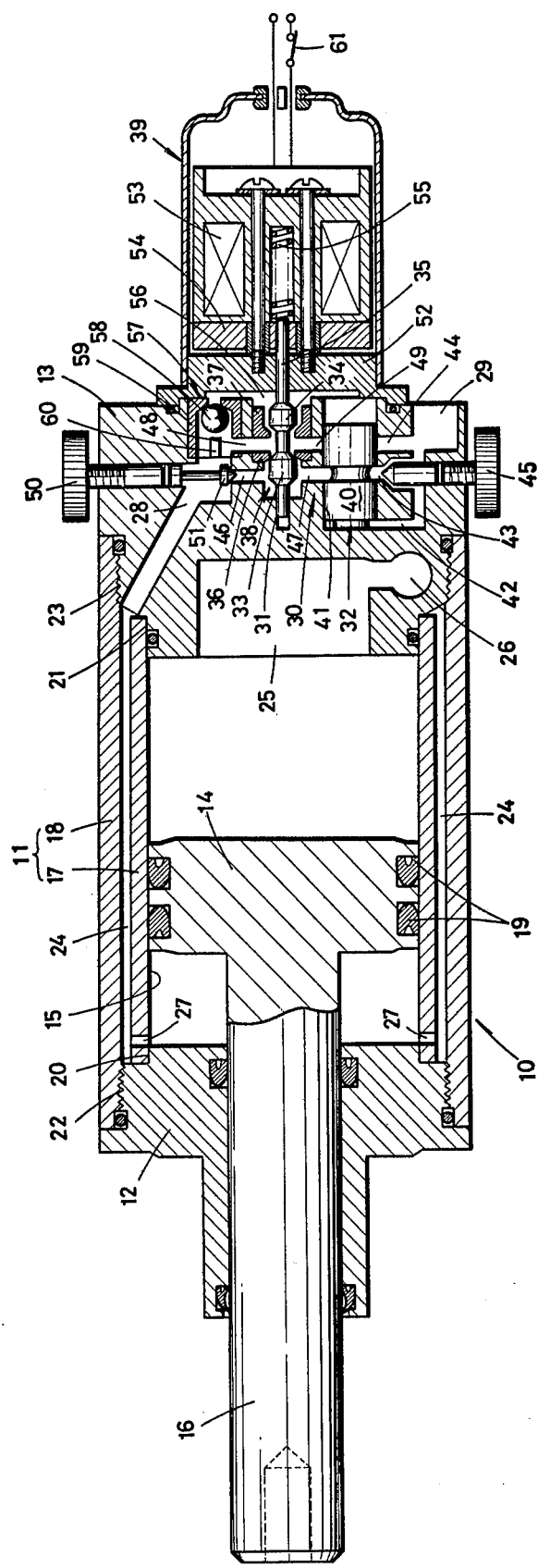
FIG. 2 is a view similar to FIG. 1, but showing the parts when the rod is stopped.

While the piston 14 is being advanced, the switch 61 is closed to activate the solenoid 39 to thereby move the poppet valve 31 to the second position as shown in FIG. 2. With the poppet 34 unseated, the fluid flows from the passage 48 to the passage 56 to act on the right end of the spool 40 which in turn shifts to the left until it assumes the position shown in FIG. 2. Accordingly, the fluid flow directed from the passage 49 to the passageway 44 is blocked to thereby stop the advancing movement of the piston 14.

SLOW ADVANCE

Figure 3:
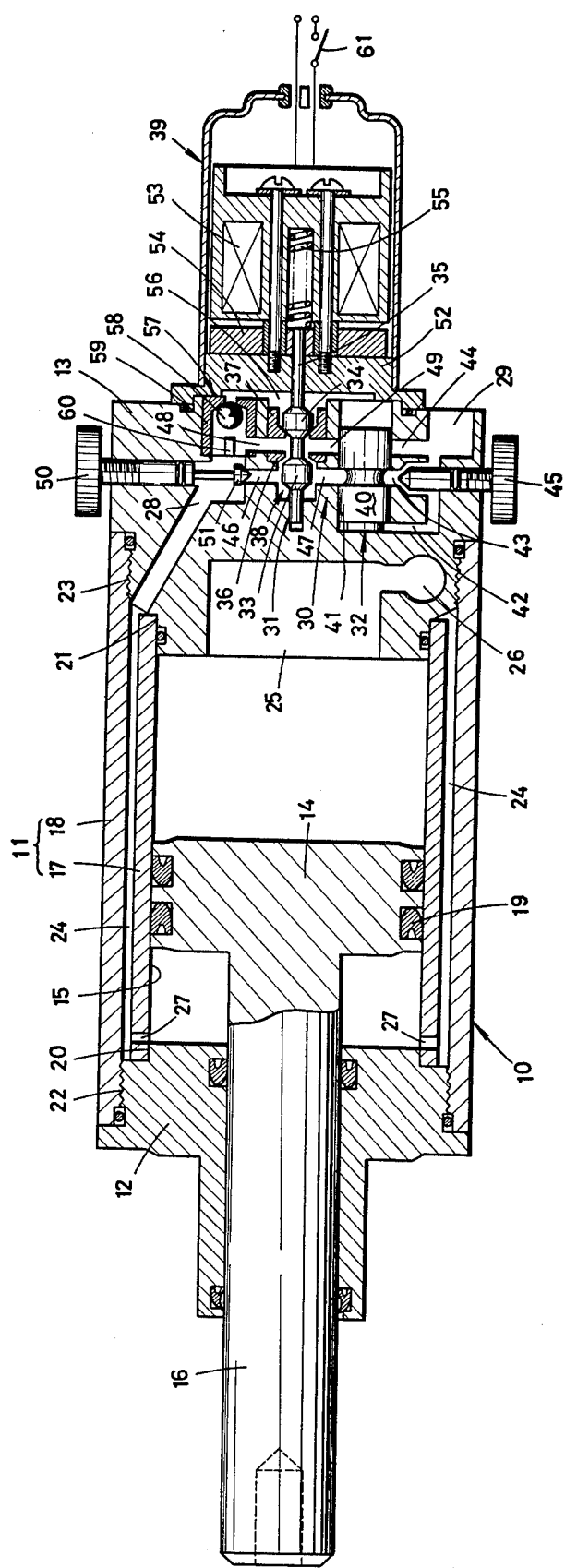
FIG. 3 is a view similar to FIG. 1, but showing the parts while the rod is being advanced at a low speed.

With the piston 14 stopped after an initial advance, the switch 61 is opened to de-energize the solenoid 39 whereupon the poppet valve 31 is returned to the first position under the bias of the spring 55, the spool 40 being still held in the position shown in FIG. 3 to communicate the passage 47 with the passageway 43. The fluid flow is then directed from the passage 48 through the passage 47 and the passageway 43 to the outlet port 29. The rate of advance of the piston rod 16 can be controlled by adjusting the throttling valve 45 which restricts the effective flow rate through the passageway 43. The movement of the piston 14 can be switched quickly from the rapid advance to the slow advance by turning on the switch 61 momentarily.

INTERMITTENT ADVANCE

While the piston rod 16 is advanced slowly, the switch 61 is closed again to actuate the solenoid 39 to hold the poppet valve 31 in the position of FIG. 2. The poppet 33 is seated on the seat 36 to block the fluid flow from the passage 48 to the passage 47, thus bringing the piston 14 to a stop. When the solenoid 39 is de-energized again by opening the switch 61 off, the poppet 33 is disengaged from the seat 36 to allow the piston 16 to make the slow advance again. By closing and opening the switch 61 alternately, the piston rod 16 is advanced intermittently.

RAPID RETURN

With the switch 61 open, fluid under pressure is now directed to the port 29 to move the spool 40 toward the right during which time the fluid on the right of the spool 40 is forced out of the bore 41 through the passage 56 and the check valve 57 to the passageway 28. When the spool 40 is bottomed against the right end of the bore 41, the fluid is transferred from the port 29, through the passageway 44, the passages 49, 48, thence through the passageway 28, the bypass passage 24, and the apertures 27 into the chamber defined by the bore 15, the fluid pressure acting on the left side of the piston 14 so as to return the same rapidly.

By using the selector valve 50, the movement of the piston rod 16 can be shifted from the rapid advance directly to the slow advance. More specifically, while the piston 14 is being advanced rapidly, the switch 61 is closed to shift the poppet valve 31 rightward, thereby moving the spool 40 to the left. With the selector valve 50 open, the fluid is directed from the passageway 28, through the passages 46, 47 and the passageway 43 to the outlet port 29. While the selector valve 50 is open, the piston rod 16 continues its slow advance regardless of the position of the poppet valve 31; that is, regardless of whether the solenoid 39 is energized or not. Furthermore, the selector valve 50 can be used to stop the piston rod 16 precisely at a desired position. As the piston rod 16 travels slowly with the selector valve 50 closed, the solenoid 39 is activated to stop the piston rod 16 just before a desired position. Continued energization of the solenoid 39 holds the piston rod 16 stationary. At this time, the selector valve 50 is manipulated to lift the restrictor 51 slightly away from the passage 46 to permit fluid flow therethrough. Thus, the piston rod 16 advances slowly toward the desired position at a speed corresponding to the extent that the selector valve 50 is opened. When the selector valve 50 is then closed, the piston rod 16 immediately discontinues its forward movement. The selector valve 50 thus allows fine adjustment of the movement of the piston rod 16, which will make it possible to perform a cutting edge positioning and a trial cutting operation with maximum precision.

A control device including an electric circuit for controlling the feed mechanism is described in detail with reference to FIGS. 4 and 5.

Figure 4:
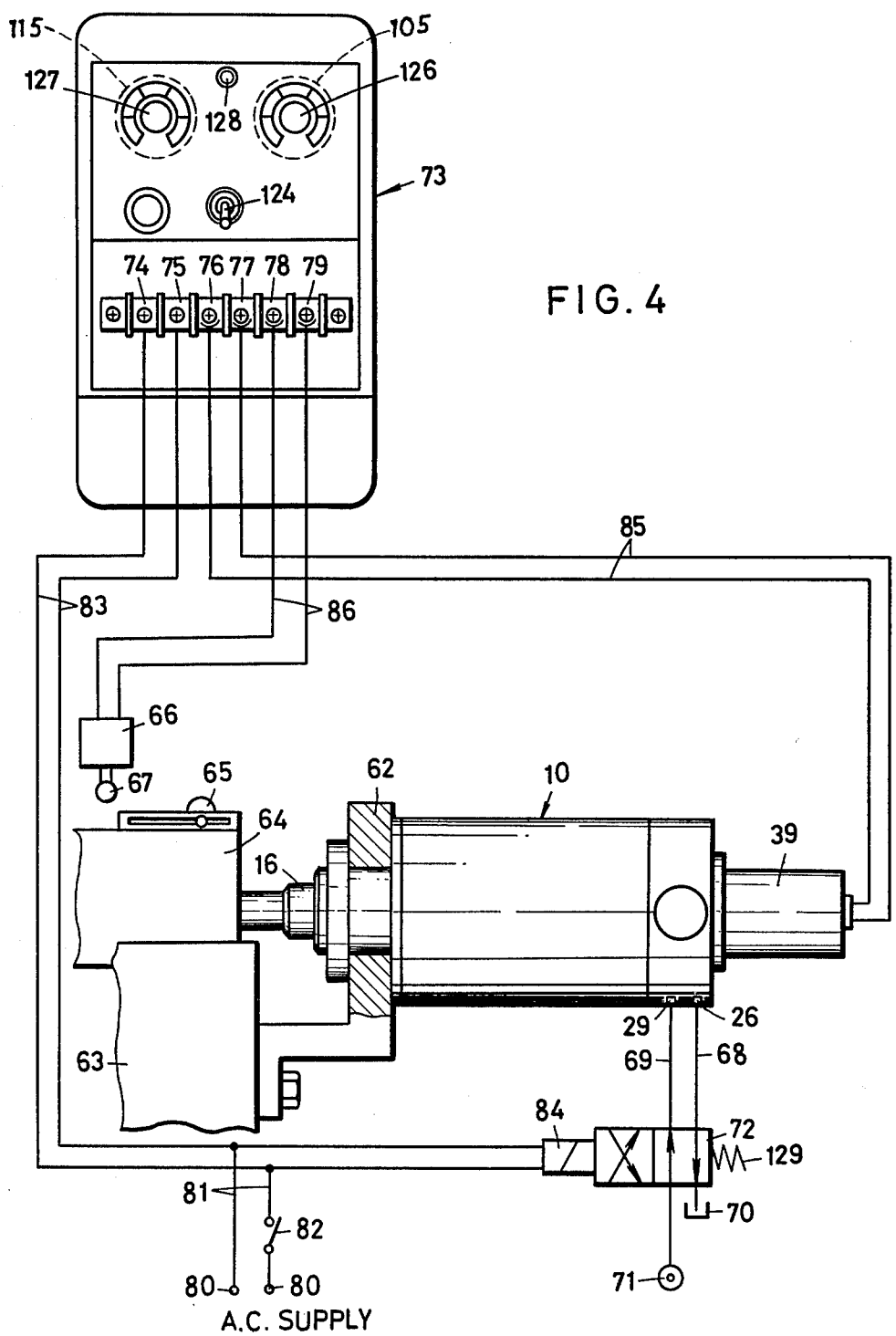
FIG. 4 is a schematic view illustrating the arrangement of the feed mechanism and a control device for controlling the operation of the feed mechanism.

As shown in FIG. 4, the fluid cylinder assembly 10 is mounted by a bracket 62 on a machine tool body 63 on which there is slidably disposed a tool slide 64 having an adjustable abutment 65 thereon, the piston rod 16 being fixed at its free end to the total slide 64. The tool slide 64 has a cutter (not shown) and is movable toward and away from a workpiece (not shown) by the piston rod 16, there being a limit switch 66 having a feeler 67 that projects into the path in which the abutment 65 on the tool slide 64 reciprocates. Connected to the ports 26, 29 are a pair of conduits 68, 69, respectively, which in turn are connected to a reservoir 70 and an accumulator 71, respectively, through a solenoid operated valve 72.

A control device generally designated at 73 contains therein the electric control circuit and has on its front panel a plurality of terminals 74 through 79. A pair of terminals 80 which are to be connected to a source of alternating current are connected to power conductors 81, one of which includes a main power switch 82. Lines 83 coupled with the power conductors 81 are connected to a solenoid 84 of the valve 72 and the terminals 74, 75. The solenoid 39 for the poppet valve 31 is coupled with the terminals 76, 77 by lines 85 and the limit switch 66 is coupled with the terminals 78, 79 by lines 86.

Figure 5:
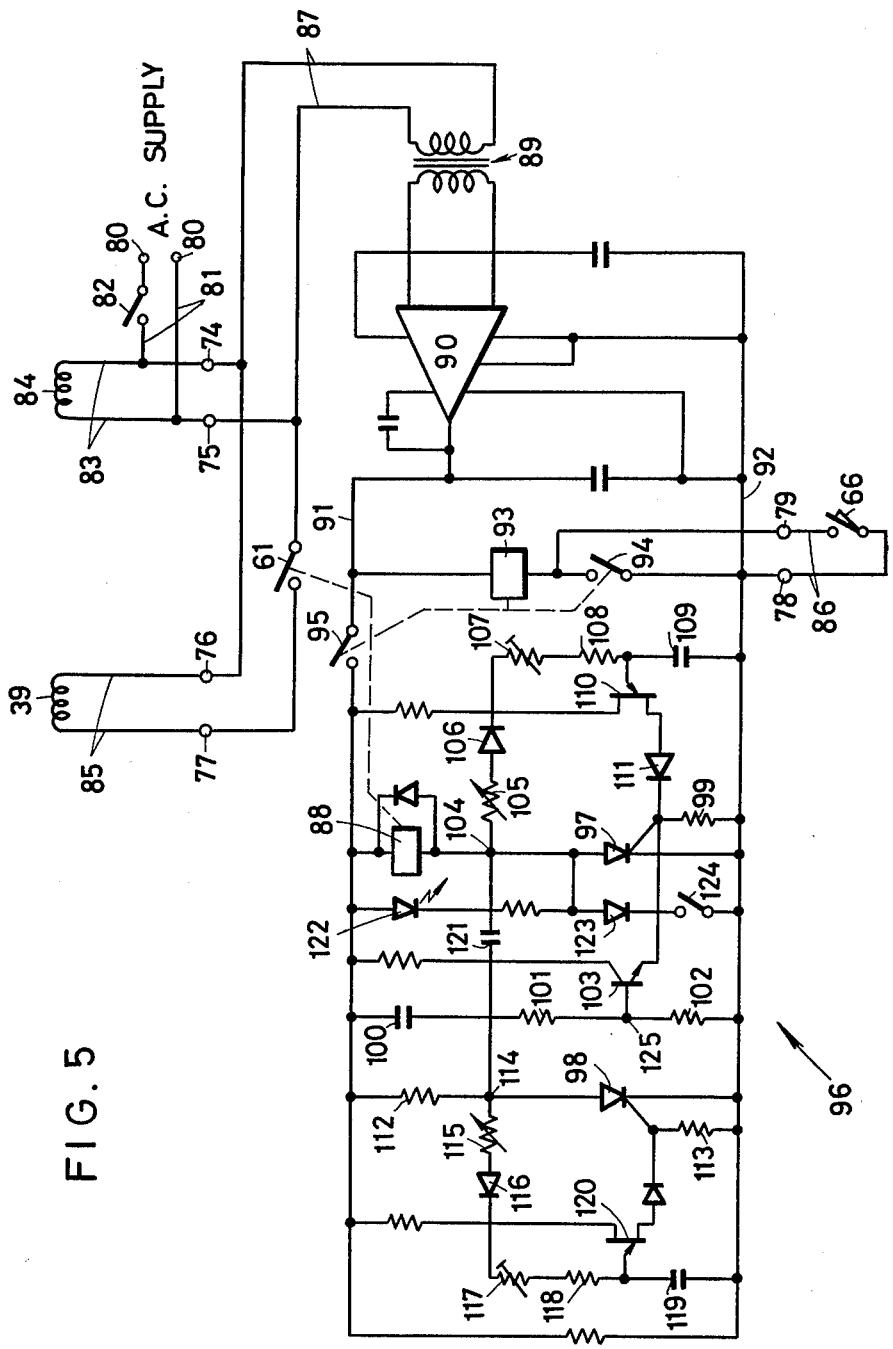
FIG. 5 is a circuit diagram of the control device.

FIG. 5 shows the electric control circuit provided in accordance with the invention and includes conductors 87 leading from the power conductors 81 and connecting the terminals 74, 75 with the terminals 76, 77, respectively, in parallel, there being disposed the switch 61 or a contact on a relay 88, in one of the conductors 87 extending between the terminals 75, 77. The conductors 87 are coupled through a transformer 89 with an automatic voltage regualtor 90 which, although not shown, includes a suitable rectifier to convert alternating current into direct current. From the automatic voltage regulator 90, there extend a power conductor 91 and a ground wire 92 between which the coil of a relay 93 is connected. The limit switch 66 is connected in series with the relay 93 having a pair of contacts 94, 95, the contact 94 being a holding contact which can retain the armature of the relay 93 in its actuated condition when the limit switch 66 is closed. Upon activation of the relay 93, the contact 95 is closed to make an electric circuit 96 described below.

The electric circuit 96 includes a pair of thyristors 97, 98 to control the actuation of the relay 88. The thyristor 97 is connected in series with the coil of the relay 88 which is coupled with the power conductor 91, the cathode of the thyristor 97 being connected with the ground wire 92. The gate of the thyristor 97 is connected through a resistor 99 to the ground wire 92. A capacitor 100 is connected between the conductor lines 91, 92 through series-connected resistors 101, 102. Coupled with a junction 125 between the resistors 101, 102 is the base of an NPN type transistor 103, the collector of which is connected to the conductor 91, and the emitter connected to the gate of the thyristor 97. A junction 104 between the relay 88 and the anode of the thyristor 97 is coupled with the ground line 92 through a variable resistor 105, a diode 106, a variable resistor 107, a resistor 108 and a capacitor 109. A unijunction transistor 110 is connected as an igniting element for the thyristor 97. The anode of the transistor 110 is connected to the conductor 91, while the cathode is connected to the gate of the thyristor 97 through a diode 111. The anode gate terminal is coupled with a junction between the resistor 108 and the capacitor 109.

The thyristor 98 is connected in series with a resistor 112 which is coupled with the conductor 91, the cathode of the thyristor 98 being connected directly to the ground line 92. The gate of the thyristor 98 is connected through a resistor 113 to the ground line 92. A junction 114 between the resistor 112 and the anode of the thyristor 98 is coupled with the ground wire 92 through a variable resistor 115, a diode 116, a variable resistor 117, a resistor 118 and a capacitor 119. A unijunction transistor 120 is connected as an igniting element for the thyristor 98. The anode of the unijunction transistor 120 is connected to the conductor 91, whereas the cathode is connected to the gate of the thyristor 98. The anode gate terminal is coupled with a junction between the resistor 118 and the capacitor 119. A capacitor 121 intercouples the junctions 104 and 114 together. A light-emitting diode 122 is connected in parallel with the relay 88 and a diode 123 is connected in parallel with the thyristor 97 with the anode of the diode 123 connected to the anode of the thyristor 97, there being a switch 124 connected between the cathode of the diode 123 and the ground wire 92.

The operation of the control circuit is as follows:

The advancing movement of the piston rod 16 is commenced by closing the main power switch 82 to actuate the solenoid 84, whereupon the solenoid operated valve 72 is shifted to the right against the resistance of a spring 129 so as to direct fluid under pressure to the inlet port 26 thereby advancing the piston rod 16. The tool slide 64 mounted on the piston rod 16 is thus moved rapidly toward the workpiece. Just before the cutter makes contact with the workpiece, the abutment 65 on the tool slide 64 engages the feeler 67 to actuate the limit switch 66. Upon closing of the limit switch 66, the coil of the relay 93 (FIG. 5) is energized to close the contacts 94, 95. When the contact 95 is closed, DC voltage is applied across the capacitor 100 at which time a charging current flows through the capacitor 100 and the series-connected resistors 101, 102 momentarily. The resistors 101, 102 establish at the junction 125 a potential high enough for the transistor 103 to be conductive. With the transistor 103 energized, a current flows from the emitter of the transistor 103 through the resistor 99 and develops a voltage across the resistor 99 and at the gate of the thyristor 97, the voltage being sufficiently high to energized thyristor 97. The current at the gate of the thyristor 97 is prevented by the diode 111 from going to the unijunction transistor 110. Upon energization of the thyristor 97, the relay 88 is actuated to close the contact 61, whereby the solenoid 39 is actuated to shift the poppet valve 31 for stopping the rapid advance of the piston rod 16 as described before.

When the thyristor 97 is energized, the thyristor 98 is de-energized with a high voltage developed at the junction 114, the capacitor 121 being charged with its one side coupled with the junction 114 whereas the other side of the capacitor 121 coupled with the anode of the thyristor 97 has zero potential. The voltage at the junction 114 is the same as that of the power source and enables the capacitor 119 to be charged. Upon lapse of time determined by a time constant dependent upon the resistors 115, 117, 118 and the capacitor 119, or when voltage across the capacitor 119 rises sufficiently high to energize the unijunction transistor 120, the transistor 120 is rendered conductive to develop a positive potential across the resistor 113. The potential then triggers the thyristor 98, whereupon the anode potential becomes zero. At this time, the capacitor 121 is discharged to induce a negative voltage at the anode of the thyristor 97. The thyristor 97 is now cut off to thereby de-energize the relay 88, thus opening the contact 61 to de-energize the solenoid 39 whereupon the poppet valve 31 is moved away from the solenoid 39 to permit the tool slide 64 to make slow advance and then start the cutting operation.

When the thyristor 97 is de-energized, the capacitor 121 is charged and at the same time, the capacitor 109 is charged through the resistors 105, 107 and 108. Upon lapse of time determined by a time constant established by the resistors 105, 107, 108 and the capacitor 109, the voltage across the capacitor 109 causes the unijunction transistor 110 to operate whereupon a current flows through the diode 111 to develop a positive potential across the resistor 99. By this potential, the thyristor 97 is energized again to actuate the relay 88, thus closing the contact 61 to energize the solenoid 39. The cylinder rod 16 is brought to a stop again. With the thyristor 97 energized, the potential at the junction 104 becomes equal to that of the ground wire 92 and the capacitor 121 is discharged to thereby cut off the thyristor 98. Simultaneously, the voltage at the junction 114 charges the capacitor 119 again. The charged capacitor 119 renders the unijunction transistor 120 conductive again after the lapse of time determined by the time constant established by the resistors 115, 117, 118 and the capacitor 119.

In this manner, the relay 88 is alternately energized and de-energized by the thyristor 97 to advance the piston rod 16 intermittently. Intermittent advance of the tool slide 64 enables the cutter to produce relatively small chips during cutting operation which can be handled with utmost ease. The time interval during which the thyristor 97 is energized can be varied by adjusting the variable resistor 115 and similarly, the time interval during which the thyristor 97 is de-energized can be varied by adjusting the variable resistor 105. As shown in FIG. 4, the control panel 73 is provided thereon with a pair of knobs 126, 127 operatively connected to the variable resistors 105, 115, respectively, so that the knob 126 is turned to control the time interval during which the piston rod 16 is advanced, and the knob 127 is turned to control the time interval during which the piston rod 16 is stopped. While the time intervals of advance and stop of the piston rod 16 can be changed depending upon the rate of travel of the tool slide 64, the diameter and speed of revolution of the workpiece, the time interval of rod advance should preferably range from 0.3 through 3 seconds, and the time interval of rod stop should preferably range from 0.05 through 0.5 second.

An indicator 128 of the light-emitting diode 122 is mounted on the control panel 73 and tells when the thyristor 97 is energized to actuate the relay 88.

Upon completion of the cutting operation, the main power switch 82 is opened to break the electric control circuit 96 and to de-energize the solenoid 84, whereupon the solenoid operated valve 72 is returned to the left or to the position of FIG. 4 under the bias from the spring 129. Then, the pressurized fluid is directed to the port 29 so as to enable the piston 14 to be returned rapidly toward its starting position shown in FIG. 1.

With the selector valve 50 is open, a mode of operation of the feed mechanism is next described. When the main power switch 82 is turned on, the solenoid 84 is actuated to direct the fluid pressure to the port 26, the piston 14 being advanced and the cutter approaching the workpiece at a rapid rate of speed. At a position where the cutter on the tool slide 64 is just short of the workpiece, the abutment 65 strikes the feeler 67 to actuate the limit switch 66, thereby actuating the relay 93 to close the contacts 94, 95, the contact 94 then holding the relay 93 in its actuated position. With the contact 95 closed, a current flows momentarily through the capacitor 100 and the resistors 101, 102 so as to hold the transistor 103 in on-position. The thyristor 97 is then energized to actuate the relay 88, thus closing the contact 61 to energize the solenoid 39. Since the selector valve 50 is open, the rapid advance of the piston rod 16 is switched directly to the slow advance as mentioned before. Although the relay 88 is alternately energized and de-energized by the control circuit 96, the open selector valve 50 permits the piston 14 to make slow advance continuously. Thus, with the selector valve 50 closed the piston rod 16 is advanced intermittently. With the valve 50 slightly open the piston rod 16 is advanced intermitently quickly. When the selector valve 50 is fully opened, the piston rod 16 is slowly continuously advanced.

The switch 124 is used to stop the advancing movement of the piston rod 16. More specifically, when the power switch 82 is turned on with the selector valve 50 closed, the tool slide 64 advances rapidly until the abutment 65 closes the limit switch 66, whereupon the tool slide 64 moves intermittently. During this intermittent advance of the tool slide 64, the switch 124 is closed to actuate the relay 88, which is maintained in its actuated condition while the switch 124 is closed. Thus, the cylinder assembly is held in the position as shown in FIG. 2 to keep the piston rod 16 in its stopped condition. When the selector valve 50 is opened at this time, the piston rod 16 is advanced at a rate of speed corresponding to the extent that the selector valve 50 is opened.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A feed mechanism for advancing a load partially at a full rate, then at a reduced rate, and then retracting the load at full rate, said mechanism comprising:
   (a) a fluid-pressure actuator having a cylinder carrying a piston from which a rod projects at one end, said cylinder and rod being adapted to act between a reference and the load, said cylinder having a first port at the other end and a second port communicating with said one end;
   (b) a 4-way valve for selecting direction of movement and having a first actuator outlet connected to said first port, a second actuator outlet, and other ports for receiving pressurized fluid and for returning fluid, said 4-way valve being disposed remotely from said cylinder;
   (c) flow-path control-valve means interconnecting said second port and said second actuator outlet, and having at least three selectable modes of operation respectively providing a first unrestricted flow path therethrough, a second restricted flow path therethrough, and simultaneous blockage of both said flow paths, and said control valve means including a selector valve having an inlet communicating with said second port and an outlet leading to said second restricted flow path;
   (d) electrical means responsive to a predetermined advance of the load for actuating said control-valve means from said first flow path mode to said second flow path mode; and
   (e) said control-valve means being resettable in response to a reversal of flow by said 4-way valve to reinstate said first flow path mode.

2. A feed mechanism according to claim 1, in which said electrical control-valve actuating means actuates said control-valve means into the blockage mode intermediate said first and second flow path modes.

3. A feed mechanism according to claim 1, in which said electrical control-valve actuating means is adapted to cycle said control-valve between said second flow path mode and the blockage mode.

4. A feed mechanism according to claim 1, in which said electrical control-valve actuating means includes:
   (a) a sensing switch responsive to the load position;
   (b) a first relay having a coil energizable by said sensing switch;
   (c) a second relay having a coil energizable by said first relay;
   (d) a solenoid actuator on said control valve means energized by said second relay;
   (e) a first timing circuit for de-energizing said second relay; and
   (f) a second timing circuit for reenergizing said second relay.

5. A feed mechanism according to claim 1, in which said 4-way valve has a spool which is spring-biased to a return position in which and by which load retraction and resetting of said control-valve means is effected.

6. A feed mechanism according to claim 1 in which said control-valve means includes a fluid-pressure actuated spool valve intersecting said flow paths and having two positions, each of which renders one of said paths conductive, and a throttling valve in said second flow path by which the restriction thereof is provided.

7. A feed mechanism according to claim 6 in which said control-valve means further includes a valve mechanism responsive to said electrical means and having at least one inlet communicating with said second port and three outlets, two of which lead to said first and second flow paths, and the third of which leads to an end of said spool valve when said electrical means energizes said valve mechanism.

8. A feed mechanism according to claim 7, said outlet of said selector valve leading to said second restricted flow path in bypassing relation to said electrically responsive valve.

9. A feed mechanism according to claim 6, in which one end of said spool valve is vented through a check valve to said second port and its other end is vented to said second actuator outlet.

10. A feed mechanism according to claim 1 in which said control-valve means includes: a spool valve intersecting said flow paths and having two positions, each of which renders one of said paths conductive, one end of said spool valve communicating with said second actuator outlet, and the other with said second port.

11. A feed mechanism according to claim 10, said selector valve inlet leading from said second port to a pair of alternatively closeable valve seats and also to said first unrestricted flow path, one of said valve seats leading to said second restricted flow path, and the other of said seats leading to said other end of said spool valve.

12. A feed mechanism for moving a load, comprising:
   (a) a fluid cylinder having a bore closed by end caps, and a piston slidable in said bore and having a rod extending through one of said caps, said rod being adapted to be connected to the load, said cylinder having a first port in the other end cap communicating with one side of said piston, and said other end cap having a second port;
   (b) passage means extending from the other side of said piston in said bore into said other end cap;
   (c) a valve assembly housed in said other end cap and connected between said passage means and said second port for controlling a flow rate of returning fluid that flows through said passage means when said first port is pressurized, said valve assembly having:
      (1) a pair of first and second passageways extending between said passage means and said second port;
      (2) a throttling valve provided between said second passageway and said second port for restricting the fluid flow through said second passageway;
      (3) a first fluid-pressure-actuated valve means for connecting only one of said first and second passageways at a time to said second port, said fluid-pressure-actuated valve means being movable in one direction in response to the pressure at said second port;
      (4) a second valve means for enabling said first passageway to communicate with said second passageway when said second passageway is connected through said throttling valve to said second port by said first valve means; and
      (5) said fluid-pressure-actuated valve being movable in the other direction in response to a pressure at least momentarily provided by said second valve means; and
   (d) means for actuating said second valve means.

13. A feed mechanism according to claim 12, further comprising a selector valve having a restrictor provided between said passage means and said second passageway to control the fluid flow therethrough.

14. A feed mechanism according to claim 12, said first valve means comprising a spool valve having a bore extending across said first and second passageways and a spool slidable for axial movement in said spool valve bore between a first position in which said spool allows said first passageway to communicate with said second port and a second position in which said spool allows said second passageway to communicate with said second port, said spool valve bore having one end connected with said second port and the other end with said first passageway and said passage means through a check valve which is normally closed when said passage means is under pressure.

15. A feed mechanism according to claim 14, said second valve means comprising a poppet valve having a valve rod extending across said first and second passageways, a pair of first and second poppets on said valve rod, and a pair of first and second valve seats between said first passageway and said spool valve bore, and between said first passageway and said second passageway, respectively, said valve rod being axially movable between a first position in which said first poppet engages with said first valve seat and said second poppet disengages from said second valve seat, and a second position in which said first poppet disengages from said first valve seat and said second poppet engages with said second valve seat.

16. A feed mechanism according to claim 15, in which said actuating means comprises a solenoid mounted on said other end cap and having a ferromagnetic plate connected to said valve rod of said poppet valve.

17. A feed mechanism according to claim 16, further including an electric control circuit for energizing and de-energizing said solenoid, said circuit comprising:
   (a) a sensing switch responsive to the load position;
   (b) a first relay having a coil energizable by said sensing switch;
   (c) a second relay having a coil energizable by said first relay;
   (d) said solenoid being energizable by said second relay;
   (e) a first timing circuit for de-energizing said second relay; and
   (f) a second timing circuit for reenergizing said second relay.

* * * * *